June 25, 1935.    P. M. HENGSTENBERG    2,005,895
FASTENING DEVICE
Filed May 11, 1933
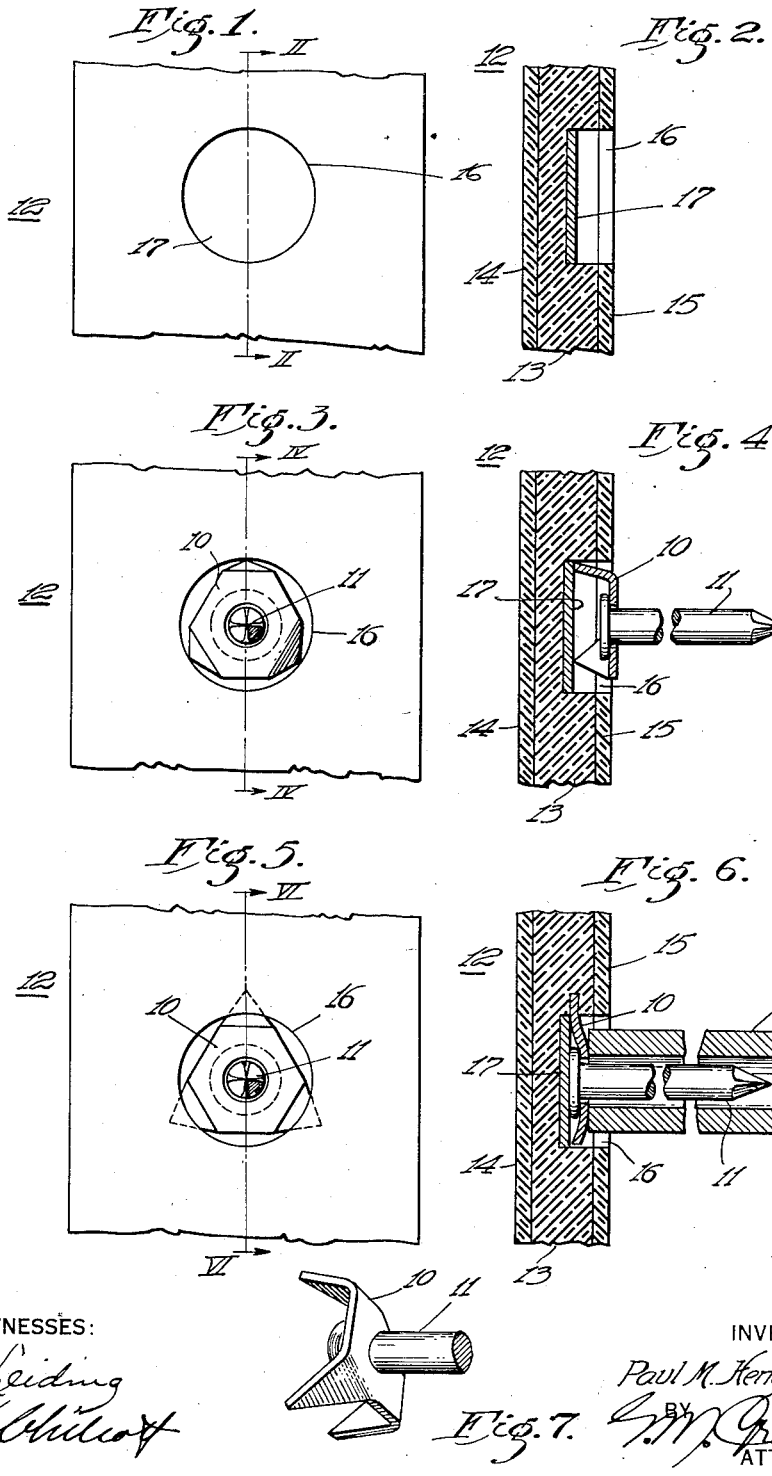
WITNESSES:
INVENTOR
Paul M. Hengstenberg.
BY
ATTORNEY Patented June 25, 1935

2,005,895

UNITED STATES PATENT OFFICE 2,005,895

FASTENING DEVICE

Paul M. Hengstenberg, Wilkinsburg, Pa., assignor to Westinghouse Electric & Manufacturing Company, East Pittsburgh, Pa., a corporation of Pennsylvania Application May 11, 1933, Serial No. 670,481

4 Claims. (Cl. 72—19)

My invention relates, generally, to fastening devices and more particularly to devices suitable for securing ornamental paneling, or the like, in position on the walls of buildings.

An object of my invention, generally stated, is to provide a fastening device which shall be simple and efficient in operation and which may be economically manufactured and installed.

A more specific object of my invention is to provide a fastening device for mounting a panel on the wall of a building in a manner to prevent marring the ornamental surface of the panel.

Another object of my invention is to provide for securing a nail, or the like, in one side of a panel without the nail extending through the panel.

Other objects of the invention will, in part, be obvious and will, in part, appear hereinafter.

The invention, accordingly, is disclosed in the embodiment thereof shown in the accompanying drawing and comprises the structural features and the combination of elements and arrangement of parts which will be exemplified in the construction hereinafter set forth, and the scope of the application of which will be indicated in the claims.

For a fuller understanding of the invention, reference may be had to the following detailed description, taken in connection with the accompanying drawing, in which:

Figure 1 is a view, in elevation, of a portion of a panel prepared to receive a fastening device;

Fig. 2 is a view, in section, taken on the line II—II of Fig. 1;

Fig. 3 is a view, in elevation, of a portion of a panel with a fastening device, constructed in accordance with my invention, inserted in a preliminary position in the panel;

Fig. 4 is a view, in section, taken on the line IV—IV of Fig. 3;

Fig. 5 is a view, in elevation, of a portion of a panel with the fastening device secured in the panel;

Fig. 6 is a view, in section, taken on the line VI—VI of Fig. 5; and

Fig. 7 is a view, in perspective, of the fastening device.

Referring to the drawing, I have illustrated one embodiment of my invention which comprises an expansible member or metal plate 10 of a triangular shape and having an opening therein for receiving the shank of a nail 11, or other suitable fastening device. While it is preferred to make the plate 10 of a triangular shape, it will be readily understood that various other shapes may be utilized if desired. The plate 10 is preferably stamped from sheet metal and the corners or vertices of the triangle are bent to form an obtuse angle with the bottom side of the plate, the top surface thereby being of a hexagonal shape, as shown in the drawing.

The fastening device herein described is particularly adapted for securing panels having a veneered surface to the walls and partitions of buildings where it is desired to prevent marring the veneered or ornamental surface of the panels and to have the fastening means entirely concealed from view. I have shown a portion of a panel 12 having an inner layer 13, composed of a relatively soft material such as fiber board or the like and outer layers 14 and 15 of any suitable veneering material attached to the surfaces of the fiber board. However, the inner layer of the panel may be composed of any other suitable material, such as soft wood, and only one surface may be veneered if desired. The veneering may consist of any of the well known hard woods, which are suitable for that purpose, or it may be a molded product.

The panel 12 is prepared for receiving the fastening device by counter boring a hole 16 in the surface of the panel which faces the wall, that is, the surface opposite the veneered surface which it is desired to prevent marring. As shown, the hole 16 extends only part way through the panel and is of sufficient diameter to receive the plate 10 when the corners are bent over as previously described.

A metal disc or washer 17 may be placed at the bottom of the hole 16 to facilitate the spreading or expanding of the corners of the metal plate 10, as will be described more fully hereinafter. However, if the veneering 14 is composed of a sufficiently hard material and the hole 16 extends through, or approximately through, the layer 13 of the panel, it is not necessary to utilize the metal disc 17.

The nail 11 is assembled in the plate 10 and the corners of the plate are inserted in the hole 16, as shown in Fig. 4. A hollow punch 18 may then be placed over the shank of the nail, as shown in Fig. 6, and the corners of the plate 10 caused to expand into the layer 13 of the panel 12 by striking the end of the punch 18 with a hammer. When pressure is applied to the top of the plate 10, the corners of the plate are forced outwardly by the metal disc 17 and become imbedded in the panel 12, thereby securing the nail 11 in the panel.

After a sufficient number of nails have been secured in the panel in the foregoing manner, it may be placed in position and the nails driven into the wall by means of a padded hammer, or other suitable instrument. In this manner veneered or ornamental paneling may be secured in position without marring the veneered surface of the paneling.

While the illustrated example constitutes a particular embodiment of my invention, I do not limit myself strictly to the details shown, since, manifestly, the same may be varied considerably without departing from the spirit of the invention, as defined in the appended claims.

I claim as my invention:

1. A means for securing a panel having a veneered surface to the wall of a building comprising a metal disc disposed at the bottom of a hole countersunk in the surface of the panel opposite the veneered surface, a nail or the like for securing the panel to the wall, a metal plate having an opening therein for receiving the shank of the nail, the corners of the plate being bent at an angle to one side of the plate and adapted to expand into the panel when the corners are inserted into the countersunk hole to engage the metal disc and pressure is applied to the plate.

2. In combination, a panel having a veneered surface, a metal disc disposed at the bottom of a hole countersunk in the surface of the panel that is to be placed next to the wall of a building, means for securing the panel to the wall, a triangular-shaped metal plate adapted to engage with the securing means, the corners of the triangular plate being bent to form an obtuse angle with the plate and adapted to expand into the panel when the corners are inserted into the countersunk hole to engage the metal disc and pressure is applied to the plate.

3. In combination, a panel having a countersunk hole in one surface thereof, a metal disc disposed at the bottom of the hole, a nail or the like for securing the panel to the wall of a building, a metal plate having an opening therein for receiving the shank of the nail, the corners of the metal plate being bent to form an obtuse angle with one side of the plate and adapted to expand into the panel when the corners are inserted into the countersunk hole to engage the metal disc and pressure is applied to the plate.

4. In combination, a panel having an opening in one surface thereof, a member having a hard surface disposed in the opening below the surface of the panel, a nail or the like for securing the panel to another object, a plate composed of a bendable material and having an opening therein for receiving the shank of the nail, portions of the plate being bent to form an obtuse angle with one side of the plate and adapted to expand into the panel when the bent portions are inserted into the opening in the panel to engage the hard surface of the member disposed therein and pressure is applied to the plate.

PAUL M. HENGSTENBERG.